Jan. 23, 1968     R. V. MISAUSKAS     3,364,746
DEVICE FOR CONVERTING THERMAL ENERGY INTO MECHANICAL ENERGY
Filed April 12, 1965

INVENTOR
Raimundas V. Misauskas
by McDougall, Hersh & Scott
Attys

United States Patent Office 3,364,746
Patented Jan. 23, 1968

3,364,746
DEVICE FOR CONVERTING THERMAL ENERGY INTO MECHANICAL ENERGY
Raimundas V. Misauskas, 1740 N. 35th Ave.,
Stone Park, Ill. 60165
Filed Apr. 12, 1965, Ser. No. 447,468
5 Claims. (Cl. 73—363.3)

ABSTRACT OF THE DISCLOSURE

Means for converting thermal energy to mechanical energy consisting of a plurality of elongated members, some of the members being formed of a material having a high thermal co-efficient of expansion and some of the members having a low thermal co-efficient of expansion. The different type of members are positioned in side-by-side, alternating relationship and an extreme end of the assembly is rigidly attached in a frame. The extreme opposite end of the assembly is unrestrained, and means to be driven by the assembly are attached at this unrestrained end. Changes in temperature will result in a reciprocating movement to provide the desired mechanical energy.

---

This invention relates to a device which is designed to take advantage of changes in temperature and the effects thereof on the expansion and contraction of metals whereby the energy resulting thereform can be utilized for practical purposes.

The expansion and contraction of metals in response to temperature changes is widely recognized. Many constructions take advantage of these characteristics in metals for achieving various purposes. For example, bimetallic elements have been developed whereby the differential expansion between two elements secured together will cause the combination to deflect from a normal plane whereby switches and other mechanisms can be operated. In other instances, single elements have been employed in systems whereby the expansion resulting due to changes in temperature will result in certain effects in the system.

Attempts have also been made to provide arrangements which take advantage of thermal expansion and contraction for converting the energy developed to practical uses. Typical efforts in this regard are disclosed in Hainley Patent No. 348,841 and Bangerter Patent No. 1,260,300. The principle drawbacks to systems of the type referred to have related to the efficiency and economy of the constructions. In many instances, the degree of thermal expansion which can reasonably be expected is incapable of developing sufficient energy whereby practical results can be obtained. Where large temperature differentials are developed to achieve more significant amounts of thermal expansion, it is often more expensive to develop the temperature conditions that it is to employ other energy sources.

It is an object of this invention to provide a construction which is adapted to efficiently and economically produce mechanical energy by taking advantage of the thermal expansion and contraction characteristics of metals.

It is a more particular object of this invention to provide a construction of the type described which employs aluminum and related alloys as a principle structural element whereby the advantageous results of the invention can be achieved at a minimum expense.

It is a still further particular object of this invention to provide a structural arrangement for a motor of the type described which is relatively simple in construction and in operation and which is capable of producing a high degree of movement in response to moderate temperature changes and which is also characterized by a highly compact nature.

These and other objects of this invention will appear hereinafetr and for purposes of illustration but not of limitation, specific embodiments of this invention are shown in the accompanying drawing in which.

The construction of this invention generally comprises a plurality of first elongated members which are formed of a material having a relatively high thermal coefficient of expansion. A second group of elongated members is provided, and these members are situated in side-by-side relationship with respect to the first mentioned members, the first and second members being in alternating positions in the resulting assembly. The second members have a relatively low thermal coefficient of expansion, and all of the members are interconnected whereby the expansion of any of the first members is adapted to be transmitted to an adjacent member to achieve an additive affect across the assembly. Specifically, the first member at one extreme end of the assembly will expand an amount depending upon the temperature conditions prevailing. The next member of this type will expand a similar amount; however, the interconnection provided by the intermediate second member will add the expansion of the first member to the next member to achieve a net result approximately twice that of the first mentioned member. Where a plurality of such members are employed, the combined affect will be substantially greater than the expansion achieved by an individual member. The second group of members referred to having the low coefficient of expansion are located in the assembly in a manner such that they will not detract from or offset the expansion achieved in the first group of members.

In the preferred form of the invention, aluminum is employed to provide the first group of members. Aluminum has a relatively high coefficient of expansion, and it is a relatively inexpensive material. Accordingly, one can achieve the advantageous results of the invention at a relatively low cost insofar as this group of members is concerned.

Steel is considered perfectly satisfactory for use in producing the second group of members, and again, a relatively low cost is involved. As will appear from the following description, the manner of assembling the respective members to achieve the results of the invention is extremely simple and, therefore, production of the products of the invention can be achieved in a highly efficient manner.

In referring to the production of mechanical energy in the following specification and claims, it will be appreciated that the invention contemplates a broad interpretation of this term. The mechanical energy referred to comprises the movement which is achieved in the construction when higher or lower temperature conditions are established. In many instances, the movement achieved can be employed strictly mechanically by attaching an extreme member in the assembly to an arm or actuating device. On the other hand, a connection may be made to any kind of arrangement utilized for the production of other forms of energy such as a dynamo.

Figure 1:
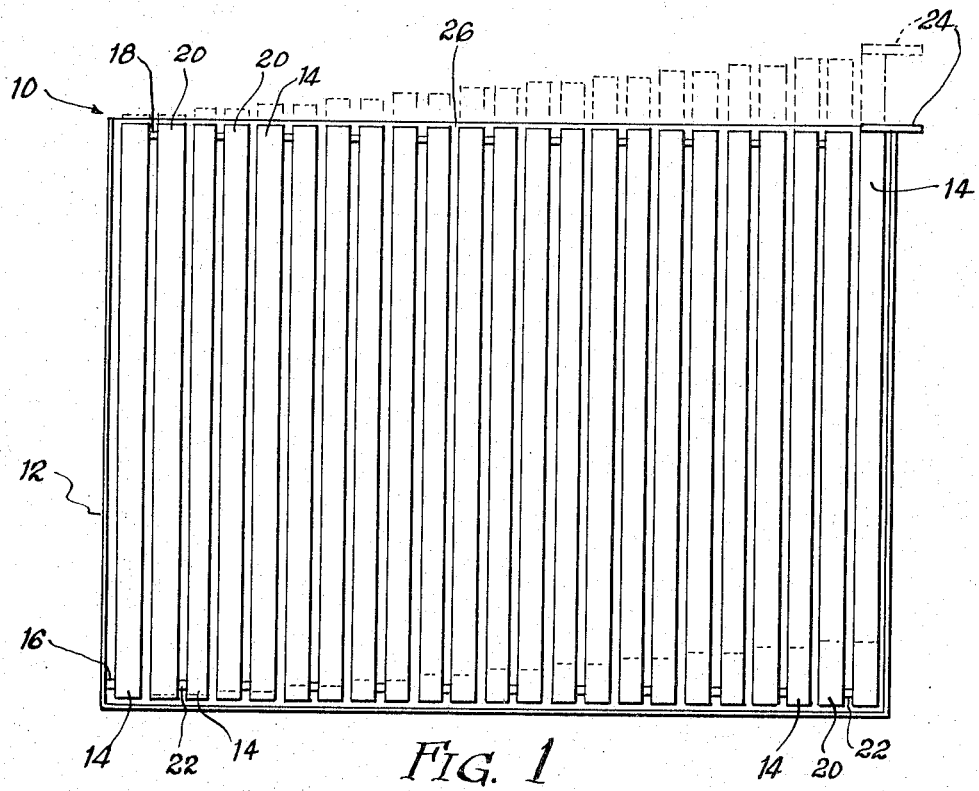
FIGURE 1 is a plan view of the construction of this invention.

FIGURE 1 of the accompanying drawing illustrates a construction 10 which includes an outer frame 12 and a plurality of elongated members situated within the frame. The first member 14 is connected at 16 to the frame whereby the connected end of this member is rigidly positioned. The opposite end of the first member 14 is connected by means of a pin 18 or the like to a second member 20. A similar pin 22 connects the opposite end of the member 20 to another member 14. As illustrated, the connections alternate from end to end of adjacent members while the first group of members 14 is located in alternating relationship with respect to the second group of members 20.

The last member in the assembly comprises a member 14, and this member is provided with an arm 24 at its end.

The end 26 of the frame 12 is open whereby each of the members in the construction is adapted to move freely with respect to the frame. When the characteristics of the respective members 14 and 20 are suitable, the assembly illustrated is adapted to provide for the development of mechanical energy.

In operation, the first member 14 which is rigidly attached to the frame will expand to a relatively small degree. By reason of the attachment 18 of this member to the member 20, it will be appreciated that the member 20 will move forward an amount approximately corresponding to the movement of the member 14. This results if the member 20 is characterized by a relatively low thermal coefficient of expansion while the member 14 will expand to a relatively high degree.

The connection 22 of the first member 20 with the second member 14 will cause the member 14 to move outwardly by an amount corresponding to the amount of movement of the member 20. In addition, the member 14 will expand an amount corresponding to the expansion of the first member 14. Therefore, a net movement is achieved in the second member 14 which is greater than the movement of the first member 14.

It will be appreciated that the second member 20 is caused to follow the second member 14 thereby moving the third member 14 outwardly by an amount corresponding to the total outward movement of the second member 14. The expansion of the third member 14 results in still further outward movement as shown in FIGURE 1.

The additive affect achieved by the construction of this invention is transmitted to the arm 24, and it will be immediately apparent that the total movement of the arm 24 is many times greater than the movement of the first member 14. A dramatic amount of movement can readily be achieved with the construction of this invention where aluminum is utilized in producing the members 14 and where steel is employed in producing the members 20. As an alternative for the production of the member 20, Invar is desirably employed since this material is characterized by a very low thermal coefficient of expansion.

The following formula provides a means for determining the amount of expansion which can be achieved in a particular system:

$$CNLT - EnLT = X$$

In the formula, C and E refer to the coefficient of linear expansion of aluminum and Invar or steel, respectively; T refers to the temperature differential; L refers to the length of the respective members; N and n refer to the number of the respective bars employed; while X comprises the amount of fluctuation which can be achieved. It will be appreciated that this latter value is limited by several factors including the thermal characteristics of the respective materials, the amount of temperature differential, and the size and number of the members 14 and 20 employed.

One highly important characteristic of the construction of this invention relates to the compact nature of the unit. Obviously, a long aluminum member could be employed to achieve a desired amount of linear movement; however, it would be necessary to provide such a member several feet long in order to achieve the same results which can be achieved by means of this invention in a unit only a few inches on a side.

Figure 2:
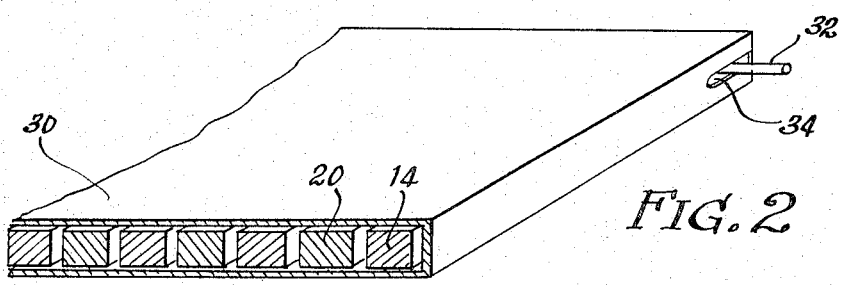
FIGURE 2 is a fragmentary sectional view of one form of a construction covered by this invention; and, FIGURE 3 is a perspective view illustrating a modified form of the invention.

FIGURE 2 illustrates an arrangement similar to that of FIGURE 1 wherein alternating members 14 and 20 are employed for achieving expansion and contraction as well as the additive affect described. A housing 30 confines the respective members, and it will be appreciated that this housing prevents the members from moving out of the plane in which they are disposed. Suitable means such as bearings, can be employed for preventing undue friction between the respective members and the housing.

The arm 32 extends out of a slot 34 defined by the housing 30. Where desired, this need comprise the only opening in the housing whereby the unit can be suitably protected from the elements.

Figure 3:
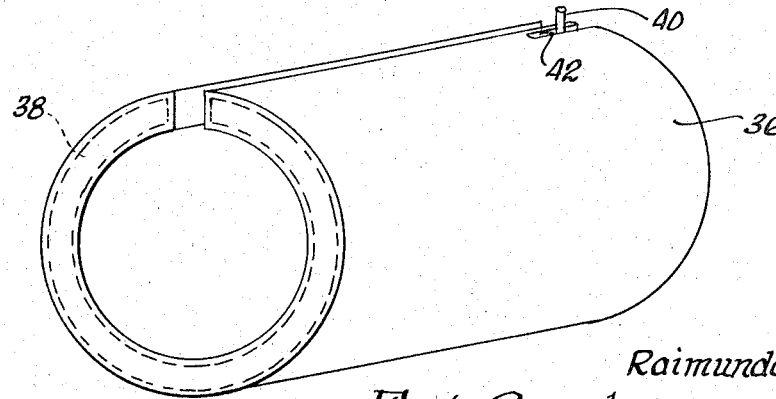

The arrangement of FIGURE 3 is similar in all respects; however, in this instance, the housing 36 is curvilinear in shape while the assembly of members designated 38 assumes a corresponding configuration. The actuating arm 40 passes outwardly of the housing through slot 42 for achieving the desired action. The design of FIGURE 3 illustrates an important feature of the instant invention in that virtually any configuration can be assumed by the described structure. The transmission of linear movement from one member to another is not impeded due to the presence of the respective elements in curvilinear planes.

The construction of this invention is adapted to be employed in a wide variety of applications. The operation is extremely quiet and, therefore, it is contemplated that the system could be employed as a power generator for military operations wherein noise must be kept to a minimum. Applications in space are feasible since great temperature differentials exist in such an environment and the compact nature of the construction is extremely valuable in this area.

It is also considered feasible to provide applications for the construction in desert locations wherein great temperature differentials are known to exist. In other applications including various motors, heating plants and the like, the unit can be employed as an auxiliary or supplementary source of power.

As a specific example of an application of this invention, reference is made to the aforementioned patents. Obviously, the construction of this invention could be tied into the operations described therein to achieve the results referred to. However, as indicated above, the invention is not to be limited by any specific application of the concepts described.

In applying a structure designed in accordance with this invention, use can be made of the linear movement in one direction on in both directions. Suitable ratchets, gears, levers, etc., are available for achieving maximum mechanical advantage with systems of the type described.

It will be understood that various changes and modifications may be made in the described construction which provide the characteristics of this invention without departing from the spirit thereof particularly as defined in the following claims.

That which is claimed is:

1. A construction for converting thermal energy to mechanical energy comprising a plurality of first elongated members formed of a material containing a major proportion of aluminum and characterized by a relatively high thermal co-efficient of expansion, a plurality of second elongated members characterized by a substantially lower thermal co-efficient of expansion, all of said members being aligned in side-by-side relationship in an assembly with said first and second members occupying alternating positions, a frame for confining said assembly whereby all parts of the assembly are maintained in substantially the same plane during operation, said frame comprising a housing with the interior surfaces of said housing being disposed closely adjacent the outer surfaces of said assembly, and including bearing means interposed between said interior surfaces and said outer surfaces, said members being connected together whereby the expansion and contraction of each of said first members is added to the expansion and contraction of an adjacent member to provide a net expansion and contraction, the member located at one extreme end of said frame being rigidly attached thereto, the member at the other extreme end of the frame including means for transmitting the movement resulting from the expansion and contraction, and wherein each of said members is connected at one point to each member located at the sides thereof, the connections between members being provided adjacent the ends thereof, with those members having other members on both sides thereof having said connections at their opposite ends.

2. A construction in accordance with claim 1 wherein the assembly of said members defines a substantially rectangular configuration.

3. A construction in accordance with claim 1 wherein said assembly defines a curvilinear configuration.

4. A construction in accordance with claim 3 including a frame member confining said assembly in said substantially the same curvilinear configuration while permitting longitudinal movement of the members in the assembly.

5. A construction in accordance with claim 1 wherein said second elongated members are formed of Invar.

References Cited
UNITED STATES PATENTS

| | | | |
|---|---|---|---|
| 334,958 | 1/1886 | Mahony | 58—133 |
| 348,841 | 9/1886 | Hainley | 60—7 |
| 648,034 | 4/1900 | Krauser | 73—363.1 |
| 809,941 | 1/1906 | Glockler | 73—363.1 |
| 1,260,300 | 3/1918 | Bangerter | 60—23 |

LOUIS R. PRINCE, *Primary Examiner.*

W. A. HENRY, *Assistant Examiner.*